L. C. & I. S. MERRELL & W. B. GERE.
APPARATUS FOR RECOVERING THE CONSTITUENT SOLIDS OF LIQUIDS AND SEMILIQUIDS.
APPLICATION FILED JULY 15, 1907.
1,000,931.
Patented Aug. 15, 1911.
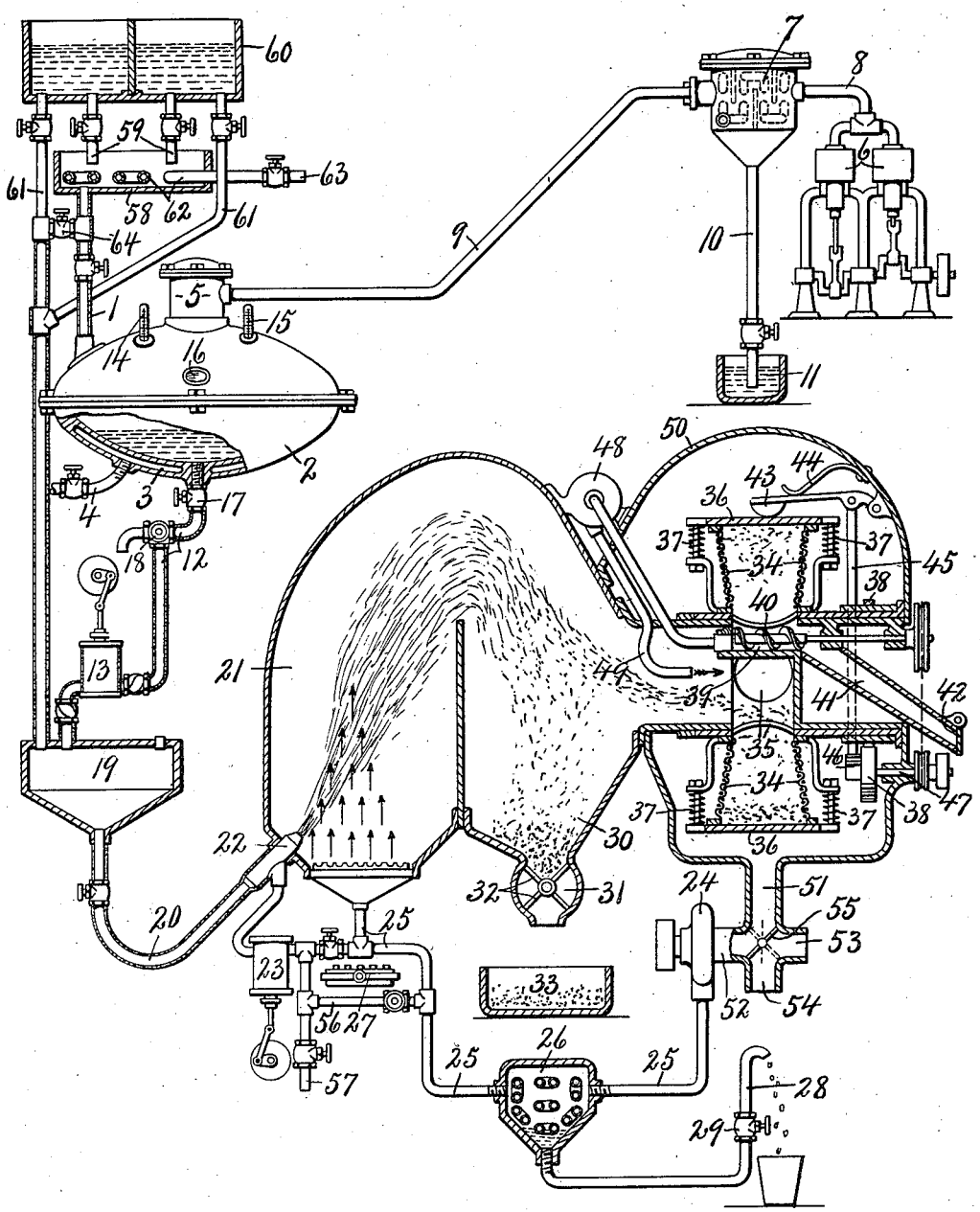

UNITED STATES PATENT OFFICE.

LEWIS C. MERRELL, IRVING S. MERRELL, AND WILLIAM B. GERE, OF SYRACUSE, NEW YORK, ASSIGNORS TO MERRELL-SOULE COMPANY, OF SYRACUSE, NEW YORK, A CORPORATION OF NEW YORK.

APPARATUS FOR RECOVERING THE CONSTITUENT SOLIDS OF LIQUIDS AND SEMILIQUIDS.

1,000,931. Specification of Letters Patent. Patented Aug. 15, 1911.

Original application filed August 29, 1906, Serial No. 332,515. Divided and this application filed July 15, 1907. Serial No. 383,739.

*To all whom it may concern:*

Be it known that we, LEWIS C. MERRELL, IRVING S. MERRELL, and WILLIAM B. GERE, of Syracuse, in the county of Onondaga, in the State of New York, have invented new and useful Improvements in Apparatus for Recovering the Constituent Solids of Liquids and Semiliquids, of which the following, taken in connection with the accompanying drawings, is a full, clear, and exact description.

This invention relates to certain improvements in apparatus for recovering the constituent solids of liquids and semi-liquids in the form of a substantially dry powder, and contemplates a rapid and continuous separation of the moisture of the solids of any liquid or semi-liquid containing highly organized substances without changing the physical or chemical structure of the solids, as set forth in our application No. 332,515, filed August 29, 1906, of which this is a division. In other words, we have sought to provide an apparatus whereby the solids of animal or vegetable liquids or semi-liquids may be speedily and economically reduced to a substantially dry condition, and still retain all of their original physical and chemical properties, so that by the addition of the same amount of moisture as removed, such solids may be reconstituted into a liquid or semi-liquid possessing all of the characteristics of the original liquid or semi-liquid.

In order to carry out these specific objects the apparatus involves the use of a desiccating chamber; means for pre-concentrating the liquid to be desiccated into a more or less viscid or semi-liquid state, either by extracting part of the moisture, or by increasing the proportion or percentage of solids and then introducing such concentrated substance in a finely divided state or spray into the desiccating chamber in the presence of a forced current of heated air or equivalent moisture-absorbent; means for removing moisture from the absorbent while in transit to the desiccating chamber; means for expanding by heat the super-dried absorbent upon its entrance into the desiccating chamber for the purpose of increasing the avidity of the absorbent and thereby not only accelerating the speed of movement of the moisture-absorbing air, but also causing an accelerated evaporation of the moisture of the finely divided particles or globules with sufficient rapidity to produce a cooling effect upon the constituent solids which preserves them from impairment and permits the absorbent air or gas to be commingled with the constituent solids under a much higher temperature than would be possible under a slowly moving current or air or if part of the moisture of such air were not extracted prior to its introduction into the desiccating chamber.

Other objects and uses relating to the means for collecting the dry solids separate from the moisture laden air will be brought out in the following description.

In the drawings we have shown a sectional view partly in elevation of an apparatus embodying the various features of our invention.

The material to be treated is supplied through a valved pipe —1—, preferably heat-insulated, to a concentrating chamber —2—, having a heating chamber —3—, for receiving a heating agent, as steam, through a valved pipe —4—. A minus pressure is maintained in the dome, as —5—, of the concentrating chamber by means of one or more pumps —6—, aided by a condenser —7—, which is connected to the pumps by a pipe —8— and to the dome by a pipe —9—. The condenser —7—, is, in this instance, provided with a pendant pipe —10—, of sufficient length so that the condensed water therein is capable of substantially counterbalancing atmospheric pressure to maintain a predetermined degree of minus pressure in the dome of the chamber, irrespective of the pumps, the excess condensed water being allowed to escape through a water-seal —11—, at the lower end of the pipe —10—. The minus pressure must be sufficient to cause ebullition and consequent separation and removal of moisture from the liquid at a predetermined temperature at which the liquid is to be concentrated.

This temperature varies according to the nature of the material, as for example, certain albuminous liquids must be concentrated at a temperature of 138° F., or less, to prevent coagulation. The liquid is constantly supplied to the concentrating chamber —2—, and the moisture-vapor, produced by the ebullition, caused by the heating agent in conjunction with the minus pressure, is continuously drawn into the condensing chamber —7—, and discharged, as water, through the water-seal —11— or through the pumps —6—, as may be desired. The liquid, freed from part of its moisture, is continuously withdrawn from the bottom of the chamber —2—, through a pipe —12—, by a pump —13—, the ebullition serving to thoroughly mix the inflowing liquid with that already in the chamber so that the outflowing liquid is of uniformly reduced moisture-content.

The strengthening chamber —2—, has a pressure-gage —4—, and a thermometer 15, to enable the attendant to maintain ebullition and regulate the temperature to avoid impairment of the solubility, color, flavor and other natural characteristics of the solids which it may be desired to preserve. The chamber —2—, is also provided with a sight-glass —16—, to enable the attendant to observe the ebullition and maintain a uniform quantity of liquid within, by regulating the inflow and outflow, thereby producing a practically uniform reduction in the moisture-content of the outflowing liquid. The outlet of the chamber —2—, is provided with a suitable regulating valve —17—, and a two-way draw-off cock —18—, the latter serving, in conjunction with the valve —17—, to permit samples of the outflowing liquid to be withdrawn, from time to time, for examination.

The discharge pipe —12—, pump —13—, and appurtenances are preferably heat-insulated and deliver the liquid into a reservoir —19—, preferably heat-insulated, thereby conserving the heat and enabling the introduction of the liquid, through pipes —20—, preferably heat-insulated, into a desiccating chamber —21—, as nearly as possible at the predetermined temperature of the liquid in the chamber —2—. At the introduction of the liquid into the desiccating chamber it is subdivided into minute particles preferably by forcing it through one or more spraying devices as shown at —22— by means of a pressure device, as a pump —23—, but it may be introduced by gravity from the reservoir —19— or in any other manner desired. The minute particles are caused simultaneously to commingle with a moisture-absorbing fluent or desiccating agent as dry air, which is forced by a pressure device, as the pump —24—, through a conduit —25—, into the desiccating chamber, intersecting the path of the inflowing liquid spray; the intense evaporation produced thereby upon the spherical surface of the particles, causing a cooling effect upon their solids. The air, either before or after entering the pump —24—, is preferably passed through a drying chamber —26—, in this instance, supplied with a cooling medium by means of which part of the moisture of the air may be percipitated by condensation, and the air is then heated and expanded by a heater —27—, thereby materially increasing its desiccating power and avidity for moisture previous to its introduction into the desiccating chamber.

The drying chamber —26—, is provided with a stand-pipe —28—, having a valve —29— which is closed, upon the initial introduction of air into the drying chamber, to prevent the escape of the air to atmosphere through the stand-pipe —28—, and opened as soon as sufficient water has collected in the drying chamber to fill the stand-pipe, which is tall enough to hold a column of water capable of substantially counterbalancing the air pressure within the drying chamber, whereupon the excess of water is free to drip continuously from the open end of the stand-pipe.

Part of the dry powder resulting from desiccation may gravitate into a receptacle —30—, having an outlet —31—, provided with a rotary gate —32—, which may be operated manually, or by any available power to automatically discharge the dry product into a receptacle —33—, while the moisture-laden air is passed through an air-pervious screen, as bolting-cloth, which practically confines within certain limits the balance of the dry solids so that they may be collected and removed automatically, or at the will of the attendant. These solids may be separated from the moisture-laden air in a rotary dust-collector, consisting of, in this instance, four tubular screen-partitions —34—, communicating through openings —35—, with the interior of the desiccating chamber, each tubular screen having its outer end closed by a head —36—, which is movable radially against the action of springs —37—. This dust-collector is rotated intermittingly, one-quarter turn at a time, by suitable gears —38—, one of which, as the driving gear, is mutilated in such manner as, when rotated continuously, to cause the openings —35—, of the screen-partitions, to be successively brought into registration with the open side of a receptacle —39—, in which is movable a screw conveyer —40—, for the purpose of removing the powder into a chute —41—, whence it may discharge through a self-closing valve —42—, into a receptacle (not shown.) The mutilated driving gear —38—, permits the screen-partitions, to remain at rest while one of them, cut off from the desiccating chamber, is discharging into the receptacle —39—, and the others, in communication with the desiccating chamber, are permitting the escape of the moisture-laden air, and collecting and retaining the desiccated product. The powder, which may adhere to the sides of the discharging screen-partition, is removed, partly by agitation, and partly by suction, the agitating means consisting of a beater —43—, acting upon the heads —36—, through the medium of a spring —44—, and an operating rod —45—, which is actuated by a revolving toothed rack —46—, on the main driving shaft, as —47—. This toothed rack is mutilated in such manner as to actuate the beater, while the screen-partitions are at rest, and to cease such action immediately before the next quarter-rotation of the dust-collector. The removal of the powder from the discharging screen-partition is facilitated by a suction-pump —48—, having its inlet communicating with the interior of the receptacle —39—, and its outlet communicating, through a conduit —49—, with the interior of the desiccating chamber, the mouth of the chute —41—, being provided with a self-closing valve —42—, to prevent neutralization of the suction.

In some instances, the moisture-laden air is returned to the drying chamber —26—, whence, its moisture having been reduced, it is again introduced into the desiccating chamber, and for this purpose the dust-collector is inclosed in a suitable casing —50—, having an outlet —51— terminating in three branches, —52—, —53— and —54—, the branch —52—, leading to the inlet of the pump —24—, while the other branches —53— and —54—, communicate with atmosphere. At the junction of these branches, is placed a rotary valve or gate —55—, which may be adjusted to open communication between the outlet —51—, and the branch —52—, cutting off communication between the pump —24—, and atmosphere, or such valve may be adjusted to open communication between the outlet —51—, and atmosphere, through the branch —53—, and to establish similar communication between the branch —52— and the branch —54—, said valve being adjustable to any intermediate position to open communication between both the pump, and the interior of the casing —50—, and atmosphere.

The pump, 23, is connected, through a valved conduit, to the conduit —25—, to enable dry heated air from the drying chamber —26—, to pass into the pump —23—, whence it may be forced through the spraying devices —22—, said pump being also connected to the conduit —25—, by an auxiliary valved conduit, —56—, avoiding the heater —27—. By adjusting these valves to admix the dry heated air with the dry cool air, air of any desired temperature may be furnished to spraying devices —22—, or atmospheric air may be drawn through a supplementary valved conduit —57—.

It may be desired to separate from the colloids, the crystalloids of liquids, like buttermilk and whey, which contain milk-sugar and albumen, and to treat either crystalloids of colloids separately, so the reservoir pipe —1—, is connected to a reservoir —58—, which may receive liquid, through valved pipes —59—, from one or both compartments of a dialyzing-vat —60—, which is also adapted to discharge its dialyzed contents, through valved pipes —61—, into reservoir —19—, for direct desiccation.

The material in the reservoir —58—, may be heated by suitable heating coils —62—, adapted to receive a heating agent, as steam, through a valved inlet pipe —63—. The supply-pipe leading from the reservoir —58—, is also connected by a valved pipe —64—, to one of the pipes —61—, which is preferably heat-insulated. The temperature of the liquid may be raised in reservoir —58— nearly to the predetermined temperature, and it may then be introduced into the chamber —2—, or, by closing communication with chamber —2—, the heated liquid may be passed at once into reservoir —19—, for desiccation, as above set forth.

Upon the introduction of the air into the desiccating chamber, its temperature is considerably reduced by the rapid vaporization of the moisture-content of the spray, so that air of a very high temperature may be introduced to desiccate liquids, the solids of which would be impaired if heated to such temperature in the original liquid state; as, for example, in the desiccation of milk, air of a temperature of from 300° F. to 400° F. may be used successfully, the air being reduced in temperature by the vaporization of the moisture, to from 140° F. to 200° F., both of these latter temperatures being above the coagulating point of the milk-albumen, but below the temperature at which milk-sugar is caramelized, without impairing in any degree the original chemical or physical structure of the solids.

Air lower in temperature than normal atmospheric air, may be introduced into the desiccating chamber, the heating device then serving, without heating said air above normal atmospheric temperature, only to expand it and increase its desiccating power, after it has been cooled and dried in the drying chamber; as, for example, nitrogen-fixing bacteria may be cultivated in sterilized skim milk and this liquid sprayed into and commingled with dried air at a temperature of, for example, 65° F.

recovering the bacteria alive and of unimpaired strength mingled with the milk solids.

Liquids containing fats or oils either in natural or emulsified state, in the presence of a suitable substance, as albumen, may be desiccated without causing the oleaginous constituent to be rendered or melted out, owing to the cooling effect produced on the solids; as, for example, the butterfat in cream retains its original globular form when the cream is reduced to dry powder, or castor oil may be emulsified with gum arabic and the liquid reduced to a dry powder, so retaining the oils that the powder is not greasy. The temperature of the air with which the dried powder comes in contact is preferably, but not necessarily, below the melting point of the oleaginous constituent; as, for example, milk, containing its full natural butterfat constituent, may be reduced to powder which, when dry, may be exposed to temperature as high as 212° F. without changing the globular form of its butterfat. The removal of the moisture and consequent cooling of the solids are accomplished in such instantaneous manner as to prevent self-impairment of the solids owing to the concentration of, for example, active non-volatile constituents; as, for illustration, lactic acid in milk is prevented from combining appreciably with the salts of the milk during the evaporation of the moisture and consequent concentration of the acid.

What we claim is:

1. An apparatus for recovering the constituent solids of liquids in the form of a dry power comprising a desiccating chamber, means for spraying the liquid into the desiccating chamber, means for condensing the liquid prior to its passage through the sprayer, mechanical means for forcing a current of air into the desiccating chamber to commingle with the finely divided liquid particles, means for extracting part of the moisture from the air while in transit to the desiccating chamber, further means for heating the partially dried air and additional means for collecting the dry solids from the moisture laden air.

2. An apparatus for recovering the constituent solids of liquids in the form of a dry powder comprising a desiccating chamber, means for spraying the liquid into the desiccating chamber, mechanical means for forcibly introducing a desiccating agent into the desiccating chamber to commingle with the finely divided liquid particles, means for recovering the dry solids separately from the moisture-laden desiccating agent, separate means for returning the desiccating agent to the desiccating chamber, and further means for extracting moisture from the desiccating agent while in transit to said chamber.

3. An apparatus for recovering the constituent solids of liquids or semi-liquids in the form of a dry powder, comprising means for removing part of the moisture from the liquid to thicken the liquid, a desiccating chamber, means for forcibly injecting the thickened liquid into the desiccating chamber in a finely divided state, and additional means for forcibly driving a desiccating agent into the desiccating chamber, and further means for collecting the dry solids separately from the moisture laden desiccating agent.

4. An apparatus for recovering the constituent solids of liquids and semi-liquids in the form of a dry powder, a concentrating chamber for the liquid wherein part of the moisture is removed, a desiccating chamber, mechanical means for forcing the concentrated liquid from the concentrating chamber into the desiccating chamber in a finely divided state, additional means for introducing a desiccating agent into the desiccating chamber to commingle with said finely divided liquid particles, and means to collect the desiccated product separately from the moisture laden desiccating agent.

5. In an apparatus for recovering the constituent solids of liquids and semi-liquids in the form of a dry powder, a desiccating chamber having separate outlets, one for the dry solids and the other for the moisture laden desiccating agent, and a moving dust collector having a plurality of screens successively communicating with the outlet for the desiccating agent and having means to permit the escape of said agent to atmosphere and to prevent the escape of the dry solids.

6. In an apparatus for recovering the constituent solids of liquids and semi-liquids in the form of a dry powder, a desiccating chamber having separate outlets, one for the dry solids and the other for the moisture laden desiccating agent, and a moving dust collector having a plurality of screens successively communicating with the outlet for the desiccating agent and having means to permit the escape of said agent to atmosphere and to prevent the escape of the dry solids, and mechanical means for removing the dry solids from the dust collector separately from the moisture laden desiccating agent.

7. In an apparatus for recovering the constituent solids of liquids and semi-liquids in the form of a dry powder, a desiccating chamber having an outlet for the moisture laden desiccating agent, moving means for preventing the powder from escaping through said outlet and permitting the escape of the desiccating agent therefrom, and mechanical means for removing the powder thus collected.

8. In an apparatus for recovering the constituent solids of liquids and semi-liquids, a desiccating chamber having separate outlets, one for the powder and the other for the moisture laden desiccating agent, a screen for collecting any powder which may be carried by said agent, mechanical means for removing the powder from the screen collector, and separate mechanical means for removing the powder from the powder outlet.

9. In an apparatus for recovering the constituent solids of liquids and semi-liquids in the form of a dry powder, a condensing chamber for the liquid, means for heating the liquid prior to its introduction into said chamber, means for drawing the liquid from the condensing chamber, a desiccating chamber, means for introducing said condensed liquid in a finely divided state into said chamber, means for introducing a moisture absorbing air into said chamber and further means for collecting and removing the dry product separately from the moisture-laden desiccating air.

10. In an apparatus for recovering the constituent solids of liquids and semi-liquids in the form of a dry powder, a heating chamber for receiving the liquid, a condensing chamber connected to and receiving the liquid from the heating chamber, means for removing the vaporized moisture from said condensing chamber, a desiccating chamber connected to and receiving the concentrated liquid from the condensing chamber, means for finely dividing the liquid upon its introduction to said desiccating chamber, means for introducing a moisture absorbing air into said chamber, and means for collecting the desiccated product separately from the air and moisture.

11. In an apparatus of the class described, a desiccating chamber having an inlet and an outlet for the desiccating agent, a housing inclosing the outlet, a receptacle between the outlet and housing, a plurality of moving screen pockets successively communicating with the outlet and receptacle, for receiving and confining the powder and discharging the same into said receptacle, and permitting the escape of the moisture-laden desiccating agent into the housing, said housing having an outlet to atmosphere.

12. In an apparatus of the class described, a desiccating chamber, a condensing chamber and means for introducing the liquid in a finely divided state into said desiccating chamber, said chamber having an inlet and an outlet for moisture absorbing air, a plurality of screen receptacles successively communicating with the outlet, and means for removing the powder from said screen receptacles when out of communication with the outlet.

13. In an apparatus for recovering the constituent solids of liquids and semi-liquids in the form of a dry powder, a condensing chamber, a desiccating chamber, means for introducing the liquid in a finely divided state into said chamber, means for introducing a moisture absorbing air into said chamber, said chamber having separate outlets, one for the dry solids and the other for the moisture-laden air, and a dust collector communicating with the outlet for the desiccating air, means for cleaning said dust collector, and means to permit the escape of said agent to atmosphere, and means to prevent the escape of the dry solids.

14. In an apparatus for recovering the constituent solids of liquids and semi-liquids in the form of a dry powder, a condensing chamber, a desiccating chamber, means for introducing the liquid in a finely divided state into said chamber, means for introducing a moisture absorbing air into said chamber, said chamber having separate outlets, one for the dry solids and the other for the moisture-laden air, and a dust collector communicating with the outlet for the desiccating air, means for cleaning said dust collector, and means to permit the escape of said agent to atmosphere, and means to prevent the escape of the dry solids, and means for removing the dry solids from the dust collector.

15. In an apparatus for recovering the constituent solids of liquids and semi-liquids in the form of a dry powder, a condensing chamber, a desiccating chamber having separate outlets, one for the dry solids and the other for the moisture laden desiccating agent, and a dust collector having a plurality of screens successively communicating with the outlet for the desiccating agent and having means to permit the escape of said agent to atmosphere and to prevent the escape of the dry solids.

16. An apparatus for recovering the constituent solids of liquids in the form of a dry powder comprising a chamber for condensing the liquid, means for withdrawing the liquid from the condensing chamber, means for supplying heat to said chamber and means for creating a minus pressure therein, a desiccating chamber having means for supplying heated air thereto, means for injecting the liquid in a finely divided state into said desiccating chamber, a plurality of outlets for air and moisture communicating successively with said desiccating chamber, screens covering said outlets, means for removing dry powder from said screens, and an outlet for the dry powder separate from the air and moisture.

17. An apparatus for recovering the constituent solids of liquids in the form of a dry powder comprising means for concentrating the liquid, means for withdrawing the liquid from the condensing chamber, a desiccating chamber having means for supplying heated air thereto, and means for injecting the liquid in a finely divided state therein, an outlet for air and moisture and a screen covering said outlet, means for removing dry powder from said screen and an outlet for the dry powder separate from the air and moisture.

18. An apparatus for recovering the constituent solids of liquids in the form of a dry powder comprising a condensing chamber and means for withdrawing the liquid from the condensing chamber, a desiccating chamber having means for supplying heated air thereto, means for injecting the liquid in a finely divided state therein, a plurality of screened outlets for air and moisture connecting intermittently with said desiccating chamber and means for removing the dry powder from said screens, allowing it to collect separate from the air and moisture.

19. An apparatus for recovering the constituent solids of liquids in the form of a dry powder comprising means for condensing the liquid, means for withdrawing the liquid from the condensing chamber, a desiccating chamber having means for introducing the condensed liquid into said chamber in a finely divided state, means for forcing heated air into the desiccating chamber to commingle with the finely divided particles and additional means for collecting the dry solids separate from the air and moisture.

20. An apparatus for recovering the constituent solids of liquid in the form of a dry powder comprising a desiccating chamber, means for spraying the liquid into the desiccating chamber, mechanical means for forcibly introducing a desiccating agent into the desiccating chamber to commingle with the finely divided liquid particles, means for recovering the dry solids separately from the moisture-laden desiccating agent, separate means for returning the desiccating agent to the desiccating chamber, means for extracting moisture from the desiccating agent while in transit to said desiccating chamber, and means for heating the dried desiccating agent before its entrance into said desiccating chamber.

In witness whereof we have hereunto set our hands this 13th day of July 1907.

LEWIS C. MERRELL.
IRVING S. MERRELL.
WILLIAM B. GERE.

Witnesses:
H. E. CHASE,
HOWARD P. DENISON.